United States Patent [19]
Negi

[11] Patent Number: 5,241,596
[45] Date of Patent: Aug. 31, 1993

[54] FACSIMILE APPARATUS, AND METHOD OF CONTROLLING SAME

[75] Inventor: Tsuneo Negi, Ayase, Japan

[73] Assignee: Canon Kabushiki Kaisha, Tokyo, Japan

[21] Appl. No.: 848,167

[22] Filed: Mar. 10, 1992

[30] Foreign Application Priority Data

Mar. 12, 1991 [JP] Japan .................................. 3-046367

[51] Int. Cl.⁵ .............................................. H04N 1/44
[52] U.S. Cl. ....................................... 380/18; 380/20; 380/48; 380/3
[58] Field of Search .......................... 380/18, 20, 3, 48

[56] References Cited

PUBLICATIONS

Diffie, W. and Hellman, M. E.: "New Direction in Cryptography", IEEE Trans. Inf. Theory, vol. IT-22, No. 6 (Nov. 1976).
Shannon, C. E.: "Communication Theory of Secrecy System", Bell Syst. Tech. Journal, vol. 28 (Oct. 1949).
Diffie, W. and Hellman, M. E.: "Privacy and Authentification: An Introduction to Cryptography", Proc. IEEE, vol. 67, No. 3 (Mar. 1979).

Primary Examiner—David C. Cain
Attorney, Agent, or Firm—Fitzpatrick, Cella, Harper & Scinto

[57] ABSTRACT

A facsimile apparatus is disclosed in which a transmitting/receiving operation, as well as a copying operation, is performed by an operator in exactly the same manner regardless of whether an encrypting device is connected to the facsimile apparatus, and regardless of whether the encrypting device includes an NCU. When the operator picks up a handset, HOOK 16 and HOOK-A 25 both rise from logical "0" to logical "1". The operator confirms an outgoing call or a signal from another party's facsimile apparatus and presses a start button. Since HOOK-A 25 is at logical "1", the flow controller 11 causes CML 23 to rise from logical "0" to logical "1", thereby starting the transmitting/receiving operation. When the operator hangs up the handset, HOOK 16 and HOOK-A 25 revert to logical "0". When the transmitting/receiving operation subsequently ends, CML 23 reverts from logical "1" to logical "0". Even if DSR 22 at logical "1" is output by an encrypting device 200 connected to the apparatus, it does not affect the state of HOOK-A 25, which is the output of an OR gate 21, the reason being that the Q output 24 of flip-flop 20 is set by CML 23 and CML 23 is at the "1" level, therefore, the Q output 24 of flip-flop 20 is logical "0".

8 Claims, 8 Drawing Sheets

FACSIMILE APPARATUS, AND METHOD OF CONTROLLING SAME

BACKGROUND OF THE INVENTION

1. Field of the Invention

This invention relates to a facsimile apparatus which performs communication after encrypting communication information. Different types of encrypting devices may be connected to such facsimile apparatus. The invention also relates to a method of controlling such facsimile apparatus.

2. Description of Related Art

The most significant feature of ordinary facsimile communication is that it is performed through a transmission control procedure in accordance with CCITT advisory T.30 and enables communication with other facsimile apparatuses via a public telephone network. However, for some users, such as governmental offices and banks, it is necessary that the contents of facsimile communications be kept confidential because of the nature of the work carried out. In order to maintain the confidentiality of such communications, the conventional practice is to connect an encrypting device to the facsimile apparatus. Such a device encrypts the contents of a communication before transmission in order to prevent the leakage of information if the apparatus is inadvertently connected to a facsimile apparatus other than that intended, for example, by dialing the wrong number, or if the telephone line of the apparatus is wire-tapped.

In a case where an encrypting device is connected to a facsimile apparatus and an encrypted communication is transmitted, an operating instruction, which differs depending upon the type of encrypting device, must be designated by using a button on the control panel of the facsimile apparatus. However, this procedure leads to the following difficulties:

(1) Before operating the apparatus, the operator must verity that the connected encrypting device is of the type which includes both a modulator/demodulator circuit and an NCU. This places an increased burden upon the operator.

(2) The control panel of the facsimile apparatus must be provided with an external connection button, which indicates that a modulator/demodulator and an NCU are external devices, thereby allowing an encrypting device of a different type to be connected to the facsimile apparatus. If the operator mistakenly presses this button, encrypted communication will no longer be possible.

(3) The internal control procedure must be changed depending upon the state of the external connection button. This necessitates more complicated software for the facsimile apparatus.

SUMMARY OF THE INVENTION

Accordingly, one object of the present invention is to provide facsimile apparatus which solves the aforementioned problems encountered in the prior art.

According to the present invention, the foregoing object is attained by providing a facsimile apparatus to which it is possible to connect different types of encrypting devices for performing communication after encrypting communication information, comprising sensing means for sensing the activity status of the encrypting device connected to the facsimile apparatus, and control means for controlling encrypted communication by the encrypting device depending upon the output form the sensing means, the encrypted communication being performed by an identical control procedure irrespective of the type of the encrypting device.

Another object of the present invention is to provide a facsimile apparatus, and a method of controlling the same, in which the apparatus can be operated in the same manner irrespective of the type of the connected encrypting device, thereby enhancing the operability of the facsimile apparatus.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the accompanying drawings.

Described first will be the construction and operation of a facsimile apparatus which performs encrypted communication by a separately installed encrypting device (of any type) connected to the apparatus.

Figure 1:
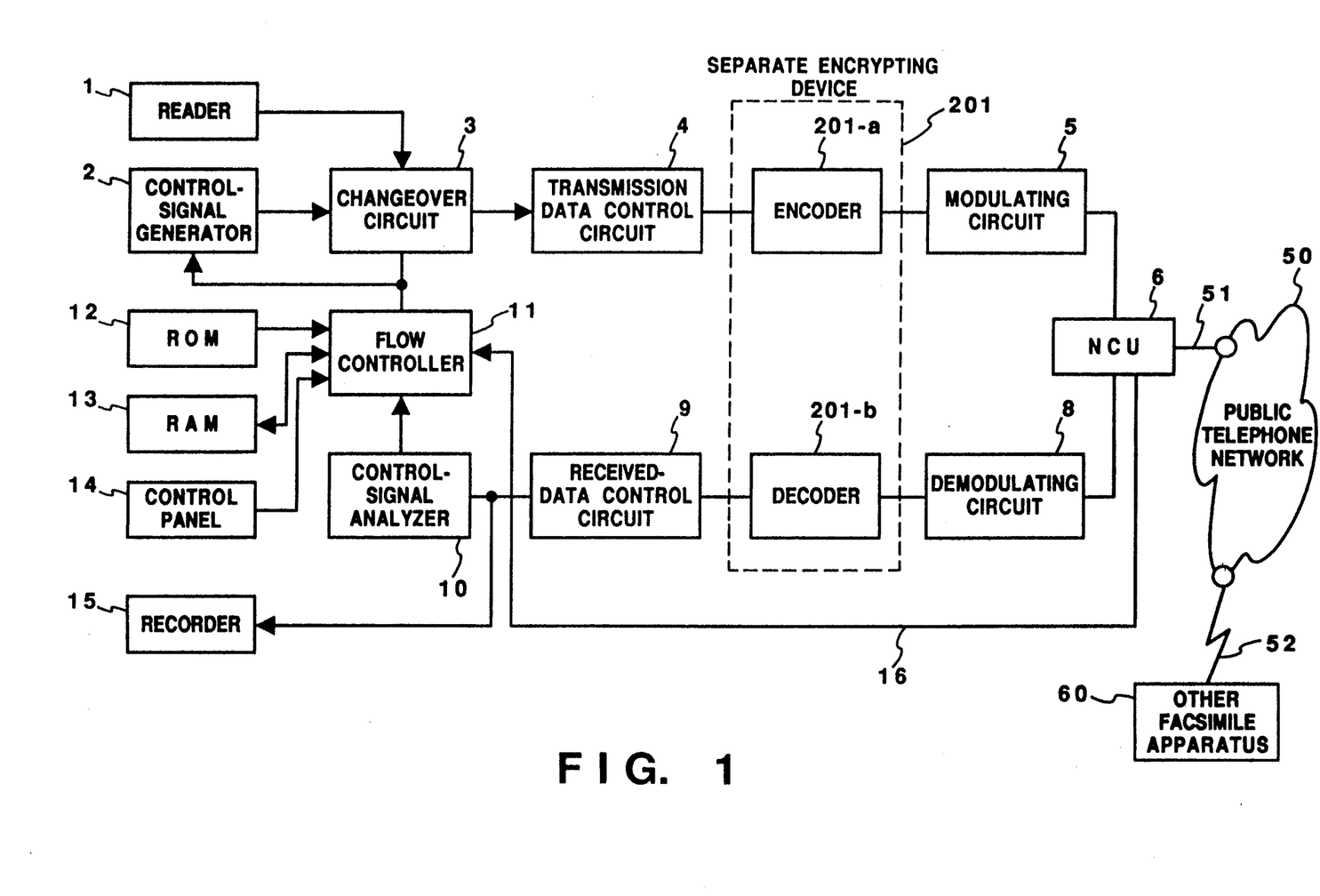
FIG. 1 is a block diagram illustrating the construction of a facsimile apparatus to which an encrypting device has been connected.

FIG. 1 is a block diagram showing the construction of a facsimile apparatus to which a separate encrypting device 201 has been connected.

In FIG. 1, a reader 1 reads image data, converts the data into a corresponding electric signal and delivers the signal to a changeover circuit 3. A control signal generating circuit 2 generates a variety of communication control signals for controlling facsimile communication. Under the control of a flow controller 11, the changeover circuit 3 selects either the image signal read by the reader 1 or a control signal generated by the control signal generator 2, and delivers the selected signal to a transmission-data control circuit 4, which converts the output signal of the changeover circuit 3 into a format of transmission data by well-known facsimile communication standards. A modulating circuit 5 modulates binary transmission data and outputs the result to an NCU (network control unit). The NCU 6 interfaces the facsimile apparatus of the embodiment with a public telephone network 50. A demodulating circuit 8 demodulates a modulated signal sent from an apparatus on the receiving side (another facsimile apparatus) via the public telephone network 50 and a transmission line 51. A received-data control circuit 9 converts the modulated data, which has been received in a predetermined format, into the processing format of the facsimile apparatus itself.

A control signal analyzer 10 extracts a communication control signal from the output signal of the received data control circuit 9 and analyzes the extracted signal. The flow controller 11 administers overall control of the facsimile apparatus, including control of a transmission control procedure, described below, in accordance with a control procedure stored in a ROM 12. The ROM 12 stores the processing procedure, etc., of the flow controller 11. A RAM 13 is used as a working memory area when the flow controller 11 executes processing. A control panel 14 is used by an operator to enter various instructions to the facsimile apparatus. A recorder 15 records received image data or image data read by the reader 1. Numeral 16 denotes a hook-detection signal, which indicates the status of a handset connected to the NCU 6.

In the facsimile apparatus having the above-described construction, encrypted image information may be transmitted manually to another facsimile apparatus 60 via the transmission line 51, the public telephone network 50 and the transmission line 52, in accordance with an input by an operator using the control panel 14. This operation will now be described.

First, the operator dials the phone number of the other party by using the control panel 14 or a telephone (not shown) connected to the NCU, and waits for an answer. When an answer is received form the other party's facsimile apparatus, a start button on the control panel 14 is pressed. When the flow controller 11 detects that the start button has been pressed, the signal 16, representing the status (on or off the hook) of the handset, is examined within the NCU 6. If the signal 16 indicates that the handset if off the hook, the NCU 6 is controlled so as to connect the transmission line 51 from the telephone to the facsimile apparatus 60, and the encrypted communication is transmitted via the separately installed encrypting device 201.

Thus, with the arrangement shown in FIG. 1, the operator manipulates the facsimile apparatus in the same way regardless of whether the separate encrypting device 201 is connected to the apparatus.

A case in which encrypted communication is performed upon connecting a separate encrypting device which contains a modulator/demodulator circuit and an NCU, to a facsimile apparatus, will now be described with reference to FIG. 2.

Figure 2:
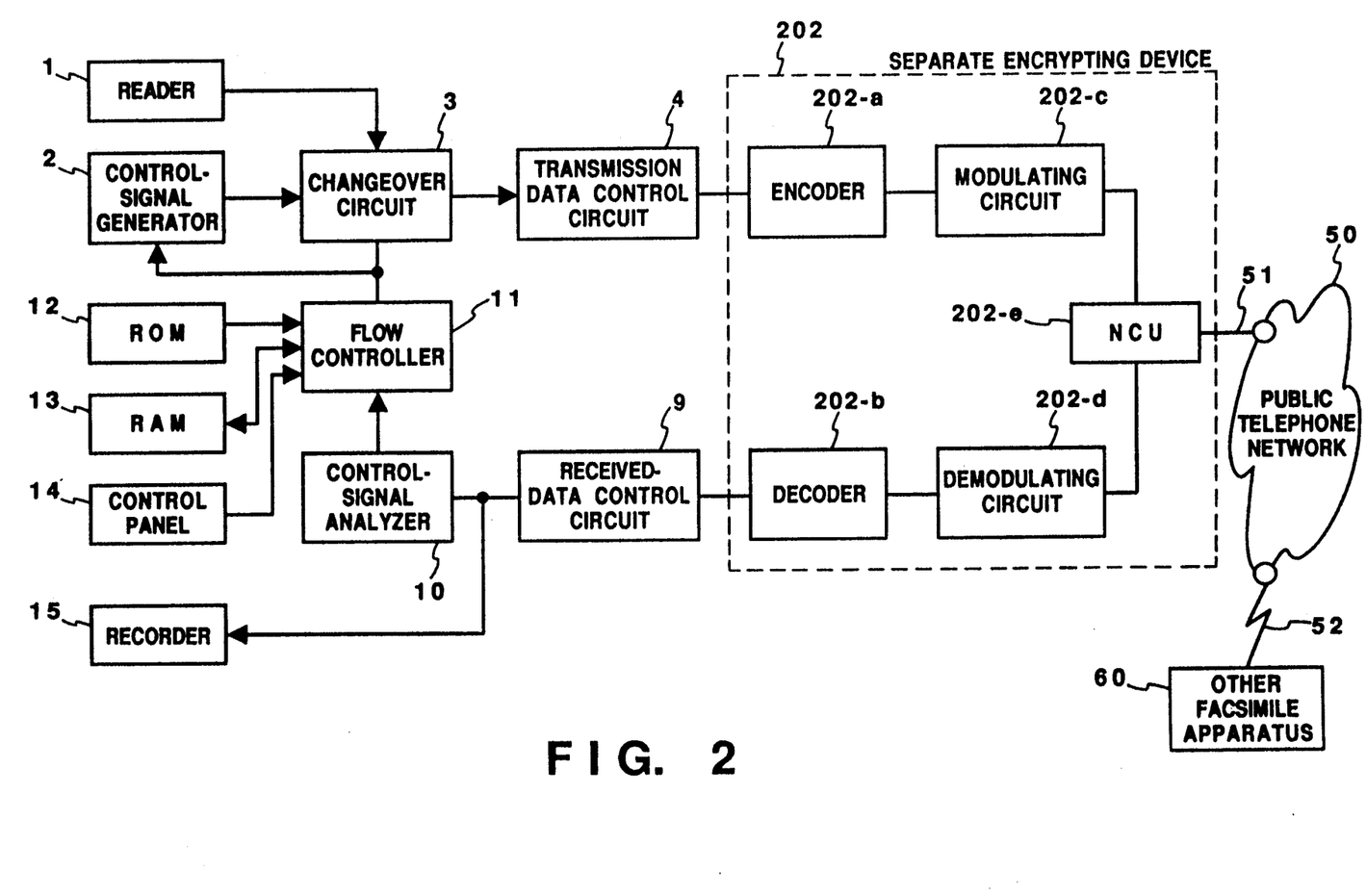
FIG. 2 is a block diagram illustrating the construction of a facsimile apparatus to which an encrypting device having an internal NCU has been connected.

As illustrated in FIG. 2, a separate encrypting device 202 includes an encoder (cipher device) 202-a, a decoder 202-b, a modulating circuit 202-c, a demodulating circuit 202-d and an NCU 202-e. In addition, it is assumed that the facsimile apparatus incorporates a modulating circuit, demodulating circuit and NCU (none of which are shown), which are separate from the above-mentioned modulating circuit 202-c, demodulating circuit 202-d and NCU 202-e.

In the arrangement shown in FIG. 2, the operator effects a connection to another facsimile apparatus 60 by a control panel (not shown) located on the separately installed encrypting device 202. Thereafter, using the control panel 14 on the facsimile apparatus, the operator presses an external connection button which indicates that external NCU and modulator/demodulator devices are connected, and then presses a start button. In response, the flow controller 11 verifies depression of the external connection button, whereupon encrypted communication is performed via the separate encrypting device 202 without checking the status of a signal (i.e. the on-hook or off-hook status of the NCU), from the NCU incorporated within the facsimile apparatus. If the operator presses the start button without first pressing the external connection button, the flow controller 11 judges that this is an instruction to start copying and initiates the copying operation.

The construction and operation of a facsimile apparatus which performs encrypted communication using an identical operation, regardless of the type of encrypting device connected thereto will now be described.

Figure 3:
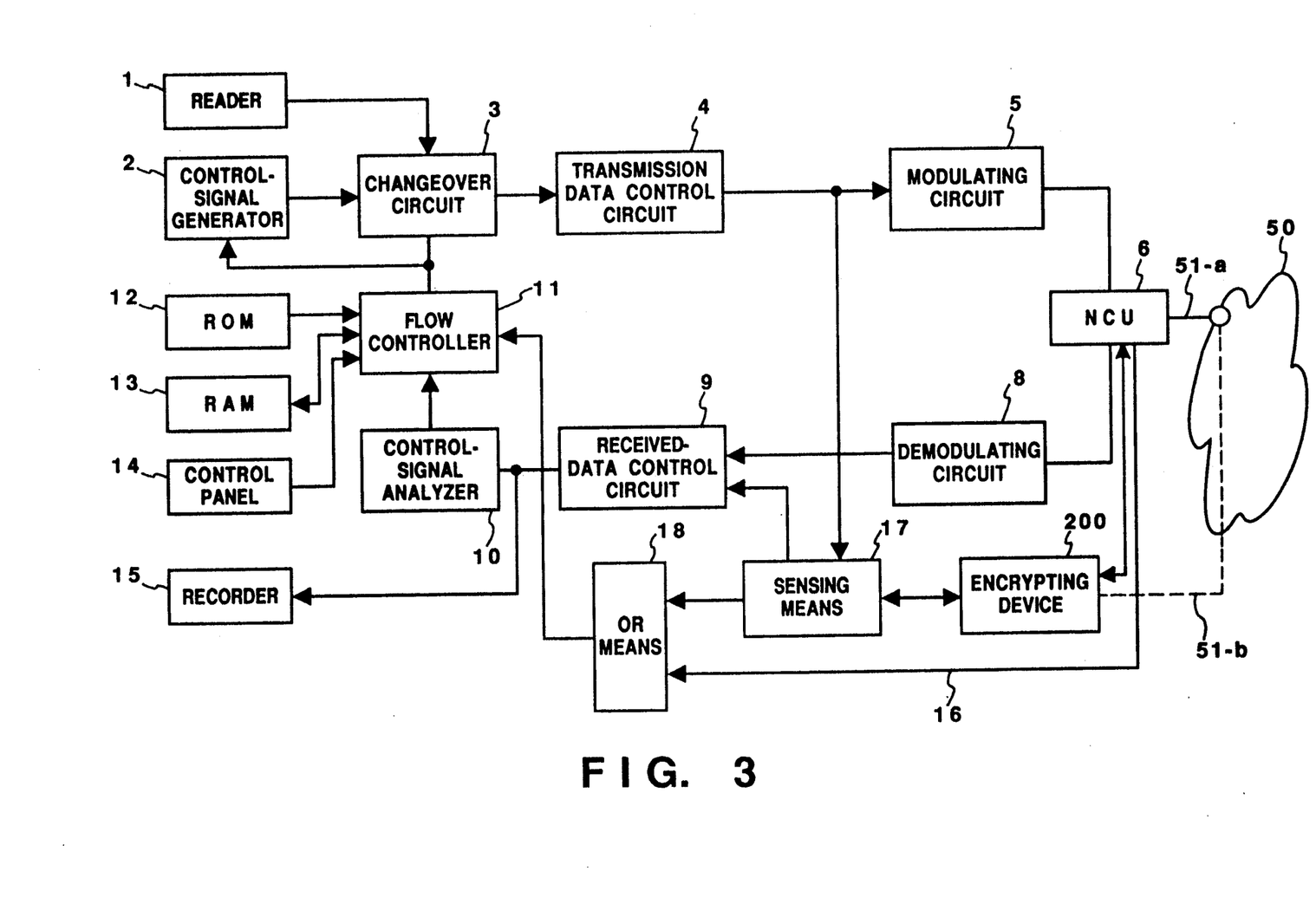
FIG. 3 is a block diagram illustrating the construction of a facsimile apparatus according to an embodiment of the present invention.

FIG. 3 is a block diagram illustrating the construction of a facsimile apparatus according to an embodiment of the present invention. Components having the same functions as those shown in FIGS. 1 and 2 are designated by like reference characters and need not be described again in detail.

In FIG. 3, numeral 17 denotes means for sensing the activity status of the encrypting device. Specifically, the sensing means 17 senses when an encrypting device 200 is in the operating state. (Motorola's SVX 2,400 is one example of a device that can be used for the separate encrypting device 200 in FIG. 3 or 202 if FIG. 2.) Also provided is OR means 18 which produces a true output if either input of the hook-detection signal 16 or input of a signal from the sensing means 17 is "true." The encrypting device 200, which is connected to the facsimile apparatus, may or may not have an internal NCU. Numerals 51-a and 51-b denote a two-wire transmission line accommodated in the public telephone network. The line is connected to the NCU 6 and the encrypting device 200, respectively.

In the case where the encrypting device 200 does not include the NCU, upon transmission, a signal from the transmission-data control circuit 4 is transmitted to the encrypting device 200. After the signal is encrypted by the encrypting device 200, it is delivered to the transmission line 51 via NCU 6. When a signal is received from another facsimile apparatus, the signal is transmitted to the encrypting device 200 via NCU 6. After the signal is decoded, it is transmitted to the received-data control circuit 9 via the sensing means 17.

In the case where the encrypting device 200 includes an NCU, a signal is output to the transmission line 51 from the encrypting device 200 and a signal received from the transmission line 51 is input to the encrypting device 200 directly, not via the NCU 6.

Figure 4:
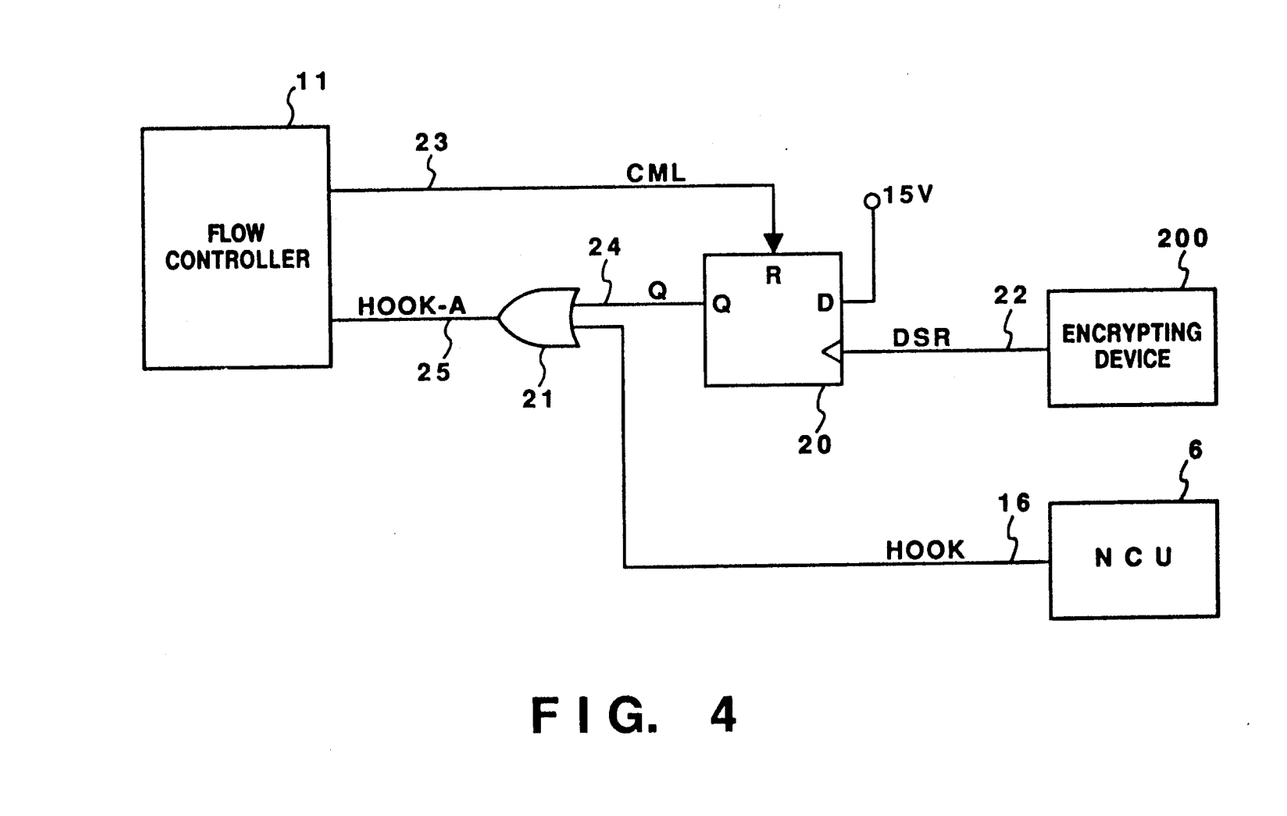
FIG. 4 is a detailed view illustrating means for sensing the activity status of an encrypting device, as well as OR means, according to an embodiment of the invention.

FIG. 4 is a diagram illustrating in detail the construction of the sensing means 17 and "OR" means 18 shown in FIG. 3. The signal lines connecting the sensing means and the OR means to the transmission-data control circuit 4 and received-data control circuit 9 are not shown in FIG. 4.

In FIG. 4, a D-type flip-flop 20 has its Q output connected to one input terminal of an OR gate 21 via a Q signal line 24. The encrypting device 200 delivers its output to the flip-flop 20 via DSR (data set ready) signal line 22. The output of the flow controller 11 is connected to the reset terminal of flip-flop 20 via a CML (connect modem to line) signal line 23 for controlling a CML relay. The output of the OR gate 21 is connected to the input of the flow controller 11 via a HOOK-A signal line 25.

A transmitting/receiving operation according to the embodiment constructed as set forth above will now be described with reference to FIGS. 4, 5 and 6.

Figure 5:
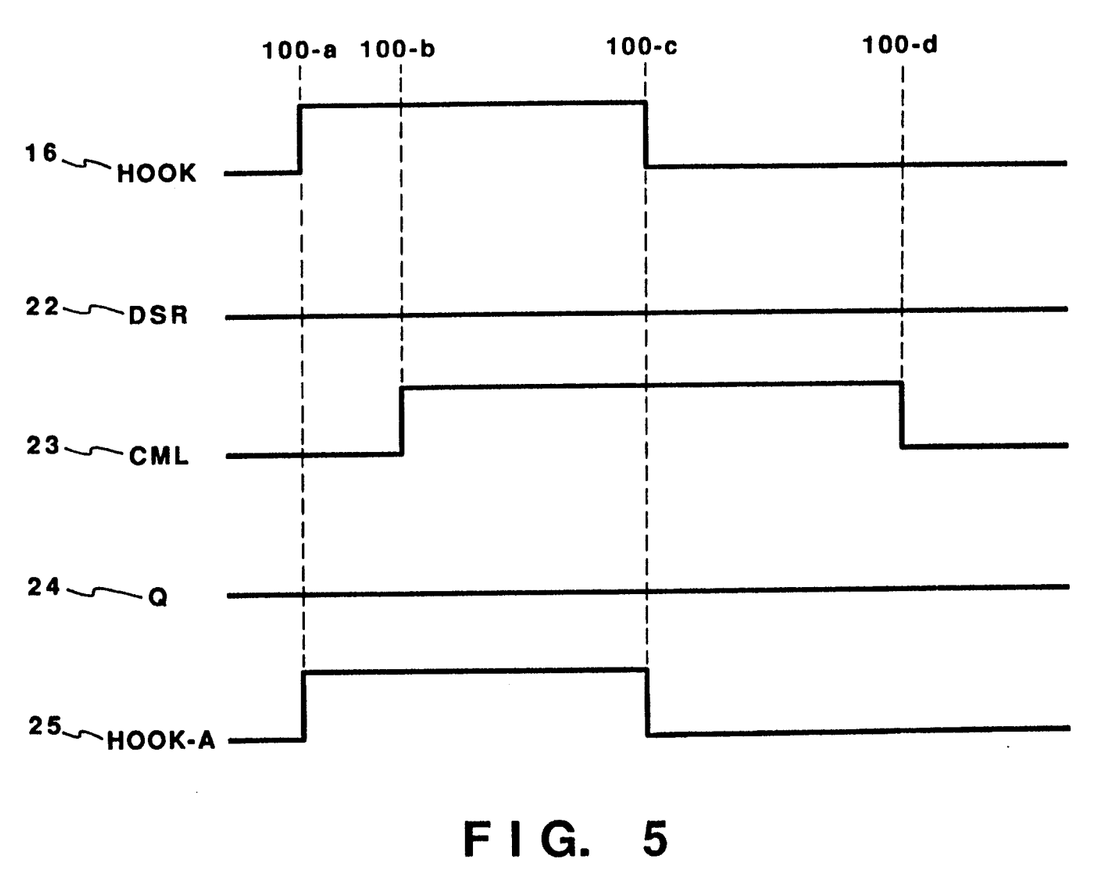
FIG. 5 is a time chart for a case in which an encrypting device has not been connected to the facsimile apparatus, and a case in which an encrypting device not having an internal NCU has been connected to the facsimile apparatus, in accordance with an embodiment of the invention.
Figure 6:
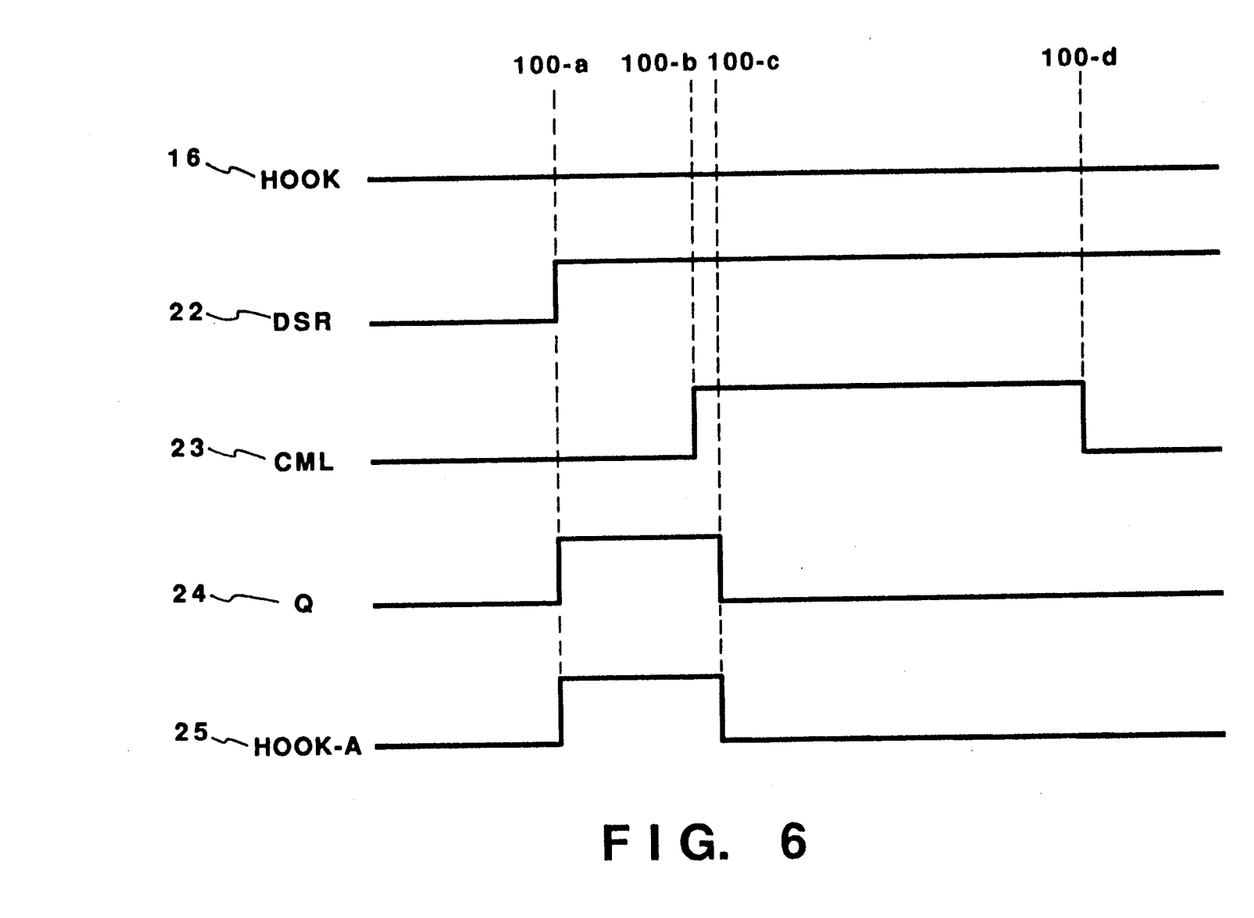
FIG. 6 is the time chart for a case in which an encrypting device having an internal NCU has been connected to the facsimile apparatus in accordance with an embodiment of the invention.

The time chart of FIG. 5 describes the transmitting-/receiving operation in a case in which an encrypting device is not connected to the facsimile apparatus and also a case in which an encrypting device that does not contain an NCU is connected to the facsimile apparatus.

When the operator picks up a handset (not shown) at time 100-a in FIG. 5, HOOK 16 and HOOK-A 25 both rise to logical "1". Next, at time 100-b, the operator confirms a call or a signal from another party's facsimile apparatus and presses the start button, whereupon the flow controller 11 causes CML 23 to rise from logical "0" to logical "1" since HOOK-A 25 is at the "1" level. As a result, a modem (not shown) is connected to the telephone line and the transmitting/receiving operation starts. When the operator returns (hangs up) the handset at time 100-c, HOOK 16 and HOOK-A 25 revert to logical "0". When the transmitting/receiving operation ends at time 100-d, the flow controller 11 causes CML 23 to revert from logical "1" to logical "0". At this time, the transmitting/receiving operation ends normally since HOOK-A 25 is already at the "0" logic level.

Even if DSR (data set read) 22 at logical "1" is output by the connected encrypting device 200 at an arbitrary timing, it does not effect the state of HOOK-A 25, which is the output of the OR gate 21. The reason being that the Q output 24 of flip-flop 20 is set by CML 23 which is at the "1" level in the interval from time 100-b to time 100-d, which is the interval over which the transmitting/receiving operation is being carried out. Therefore, the Q output 24 of flip-flop 20 is logical "0".

More specifically, even if the encrypting device 200 has not been connected to the facsimile apparatus, or even if an encrypting device not having an NCU has been connected to the facsimile apparatus, the time chart of FIG. 5 holds true. In either case, an operator performs the transmitting/receiving operation by performing the same operation.

The transmitting receiving operation for the case where the encrypting device 200 containing the NCU has been connected will now be described with reference to the time chart of FIG. 6.

By means of an NCU incorporated within the encrypting device 200, an operator connects the telephone line to another party's facsimile apparatus having the same type of encrypting device. When the telephone line is connected to the other party's facsimile apparatus, the DSR output signal 22 from the encrypting device 200 rises from logical "0" to logical "1" at time When DSR 22 attains the "1" level, the Q output 24 of the flip-flop 20 rises from logical "0" to logical "1".

Since the NCU 6 incorporated within the facsimile apparatus has not been connected to the line, the output HOOK 16 of the NCU 6 remains at logical "1" at all times. However, sine the Q input 24 to the OR gate 21 attains the "1" logic level, the output HOOK-A 25 of OR gate 21 rises to logical "1".

When the DSR output 22 of the encrypting device 200 rises from logical "0" to logical "1", ordinarily a display to this effect is presented on a display unit (not shown) of the encrypting device 200. When the operator observes this display and presses the start button on control panel 14 at time 110-b, the flow controller 11 controls CML 23 so as to rise from logical "0" to logical "1", since HOOK-A 25 is at the "1" level. As a result, the transmitting/receiving operation start, the flip-flop 20 is reset and, at time 110-c, the Q output 24 of flip-flop 20 reverts from logical "1" to logical "0". When the transmitting/receiving operation subsequently ends at time 110-d, the flow controller 11 control CML 23 so as to revert form logical "1" to logical "0". At this time, HOOK-A 25 is already at the "0" level and therefore the transmitting/receiving operation is terminated normally.

Figure 7:
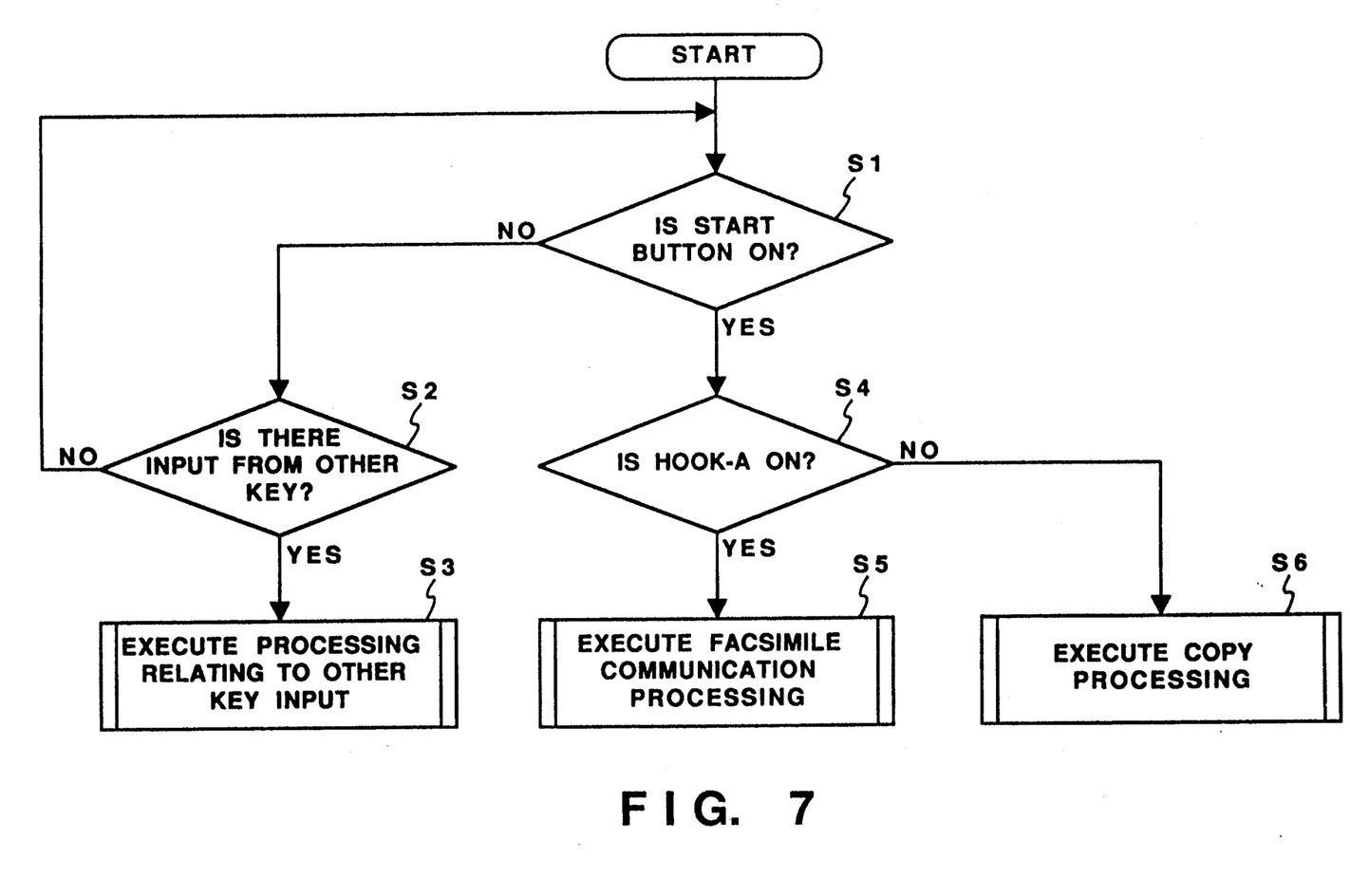
FIG. 7 is a flowchart illustrating the control operation performed by the flow controller 11 of FIG. 3.

FIG. 7 illustrates the control operation performed by flow controller 11 shown in FIG. 3. In step S1 of the flowchart, it is determined whether the start button provided on the control panel 14 has been turned on. If the start button has not been turned on, then it is determined at step S2 whether there is an input from another key. If there is an input from another key at step S2, then processing conforming to input key is executed at step S3; otherwise the program returns to step S1. If it is determined at step S1 that the start button has been turned on, then it is determined at step S4 whether HOOK-A 25 is in the on state (i.e. at the high level). If HOOK-A 25 is in the on state, then facsimile communication processing is executed at step S5. On the other hand, if HOOK-A is in the off state (i.e. at the low level), copy processing is executed at step S6.

In the example set forth above, the NCU 6 built within the facsimile apparatus is not utilized and therefore the HOOK signal 16 output from the NCU 6 is not active. However, the output from the NCU 6 is not active. However, the output HOOK-A 25, from the OR gate 21, acts in the same manner as depicted in FIG. 5, which corresponds to the case where the internal NCU 6 of the foregoing facsimile apparatus is utilized. Accordingly, the control procedure executed by the flow controller 11 and the operation which the operator performs at the control panel 14 are identical to those set forth above in connection with FIGS. 5 and 6.

MODIFICATION

In a modification of this embodiment, it is possible to adopt an arrangement in which the flip-flop 20 and the OR gate 21 in FIG. 4 are not used, the signals HOOK 16 and DSR 22 are connected directly to an all-purpose input port of the flow controller 11, and the same results as those seen in the foregoing embodiment are obtained by software means.

Steps whose numbers are the same as those in FIG. 7 involve execution of the same processing and are not described again.

Figure 8:
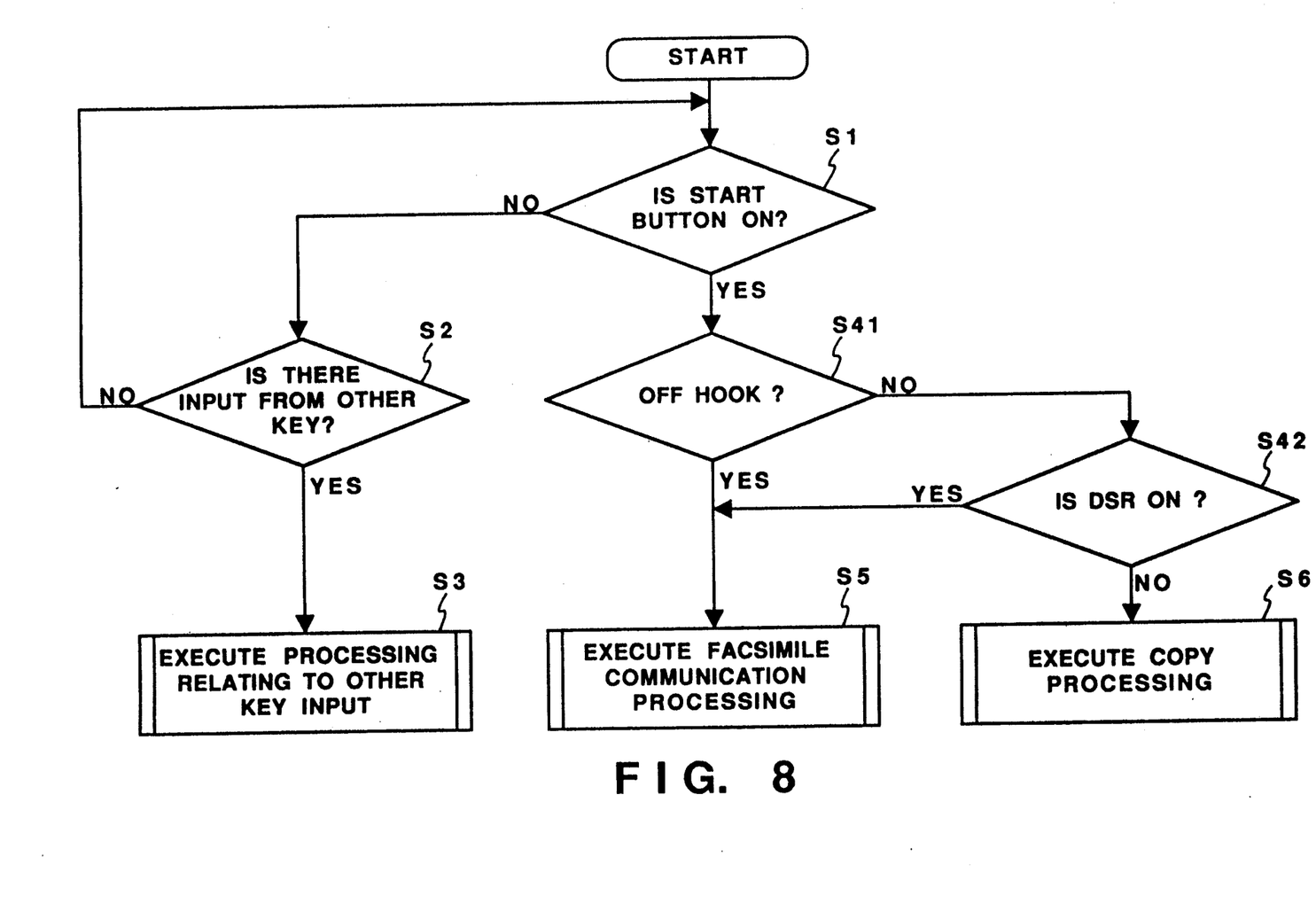
FIG. 8 is a flowchart illustrating the control operation performed by the flow controller 11 in a modification of the invention.

In FIG. 8, step S4 of FIG. 7 is replaced by steps S41 and S42. If the handset is determined to be off the hook at step S41, or if DSR is determined to be in the on state at step S42, the program proceeds to facsimile communication processing in step S5. On the other hand, if the handset is determined to be on the hook and DSR is found to be in the off state, the program proceeds from step S42 to the copy processing of step S6.

In accordance with this embodiment, as described above, the transmitting/receiving operation is performed by the operator in exactly the same manner, and the same is true for a copying operation, regardless of whether an encrypting device is connected to the facsimile apparatus, and regardless of whether the encrypting device contains an NCU. This makes it possible to enhance the operability of the facsimile apparatus.

Since many different embodiments of the present invention can be made without departing from the spirit and scope thereof, it is to be understood that the invention is not limited to the specific embodiments thereof except as defined in the appended claims.

What is claimed is:

1. A facsimile apparatus, to which it is possible to connect encrypting devices of different types for performing communication after encrypting communication information, comprising:

sensing means for sensing the activity status of the encrypting device connected to the facsimile apparatus; and control means for controlling encrypted communication by said encrypting device in dependence upon an output signal from said sensing means, wherein the encrypted communication is performed by an identical control procedure irrespective of the type of the encrypting device.

2. A facsimile apparatus according to claim 1, wherein the different types of encrypting devices include an encrypting device which has a network control unit and an encrypting device which does not have a network control unit.

3. A facsimile apparatus according to claim 1, wherein said sensing means senses the activity status of the encrypting device in accordance with a hook-detection signal output by a network control unit within the facsimile apparatus and a signal based upon a date-set-ready signal from the encrypting device.

4. A facsimile apparatus according to claim 1, wherein said control means controls encrypted communication, by means of a signal which controls a connect-to-modem-line relay, if the output signal from said sensing means indicates that the encrypting device is in an active state.

5. A method of controlling a facsimile apparatus to which it is possible to connect encrypting devices of different types, for performing communication after encrypting communication information, comprising:

a sensing step of sensing the activity status of the encrypting device connected to the facsimile apparatus; and a control step of controlling encrypted communication by the encrypting device, in dependence upon results of sensing performed in said sensing step, wherein the encrypted communication is performed by an identical control procedure irrespective of the type of the encrypting device.

6. A method according to claim 5, wherein the different types of encrypting devices include an encrypting device which has a network control unit and an encrypting device which does not have a network control unit.

7. A method according to claim 5, wherein said sensing step includes sensing the activity status of the encrypting device in accordance with a hook-detection signal output by a network control unit within the facsimile apparatus and a signal based upon a data-set-ready signal from the encrypting device.

8. A method according to claim 5, wherein said control step includes controlling encrypted communication, by means of a signal which controls a connect-to-modem-line relay, if the results of sensing performed at said sensing step indicate that the encrypting device is in an active state.

* * * * *

UNITED STATES PATENT AND TRADEMARK OFFICE
CERTIFICATE OF CORRECTION

PATENT NO. : 5,241,596
DATED : August 31, 1993
INVENTOR(S) : TSUNEO NEGI

It is certified that error appears in the above-indentified patent and that said Letters Patent is hereby corrected as shown below:

COLUMN 2

Line 2, "form" should read --from--.

COLUMN 3

Line 48, "if" should read --is--.

COLUMN 4

Line 36, "if" should read --in--.

COLUMN 5

Line 33, "(data set read)" should read --(data set ready)--.
Line 60, "time" should read --time 110-a.--.
Line 66, "sine" should read --since--.

COLUMN 6

Line 9, "start," should read --starts--.

COLUMN 7

Line 22, "upon" should be deleted.
Line 36, "date-set-" should read --data-set- --.

UNITED STATES PATENT AND TRADEMARK OFFICE
CERTIFICATE OF CORRECTION

PATENT NO. : 5,241,596
DATED : August 31, 1993
INVENTOR(S) : TSUNEO NEGI

It is certified that error appears in the above-indentified patent and that said Letters Patent is hereby corrected as shown below:

COLUMN 8

Line 7, "apparatus" should read --apparatus,--.

Signed and Sealed this

Second Day of August, 1994

Attest:

BRUCE LEHMAN

Attesting Officer     Commissioner of Patents and Trademarks